United States Patent
Wu et al.

(10) Patent No.: US 10,668,701 B2
(45) Date of Patent: Jun. 2, 2020

(54) SOUND AND HEAT INSULATING BLANKET

(71) Applicant: 3M INNOVATIVE PROPERTIES COMPANY, St. Paul, MN (US)

(72) Inventors: Pingfan Wu, Woodbury, MN (US); Lianzhou Chen, Woodbury, MN (US); Fredrick W. Vance, Westfield, IN (US); Edward E. Cole, Woodbury, MN (US); Charles W. Hedley, Danville, IN (US); Gregory L. Simon, Bloomington, IN (US); Michael C. Martin, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 302 days.

(21) Appl. No.: 15/567,185

(22) PCT Filed: May 5, 2016

(86) PCT No.: PCT/US2016/030872
§ 371 (c)(1),
(2) Date: Oct. 17, 2017

(87) PCT Pub. No.: WO2016/179339
PCT Pub. Date: Nov. 10, 2016

(65) Prior Publication Data
US 2018/0104937 A1    Apr. 19, 2018

Related U.S. Application Data

(60) Provisional application No. 62/157,297, filed on May 5, 2015.

(51) Int. Cl.
*B32B 25/08* (2006.01)
*B32B 5/02* (2006.01)
(Continued)

(52) U.S. Cl.
CPC .............. *B32B 25/08* (2013.01); *B32B 5/022* (2013.01); *B32B 5/245* (2013.01); *B32B 25/10* (2013.01);
(Continued)

(58) Field of Classification Search
CPC ......... B32B 25/08; B32B 25/10; B32B 5/022; B32B 5/245; B32B 25/14;
(Continued)

(56) References Cited

U.S. PATENT DOCUMENTS 3,876,034 A * 4/1975 Antonini ................... E04B 1/86
181/208
4,131,702 A * 12/1978 Alfter ..................... B32B 27/10
428/76

(Continued)

FOREIGN PATENT DOCUMENTS

CA    2984162 A1 * 11/2016 ............. B32B 5/022
CN    103724740 A    4/2014
(Continued)

OTHER PUBLICATIONS

Coran, Aubert Y., "Vulcanization", The Science and Technology of Rubber, Chapter 7 (Third Edition, Elsevier 2005).
(Continued)

*Primary Examiner* — Forrest M Phillips
(74) *Attorney, Agent, or Firm* — Philip P. Soo (57) ABSTRACT

A sound and heat insulating blanket is presented comprising: a) a first layer of fabric comprising first fibers; and b) a first sound barrier film comprising a first rubber; wherein the first layer of fabric and first sound barrier film are bound together through a first interpenetrated binding layer wherein the first rubber of the first sound barrier film is interpenetrated by the first fibers of the first layer of fabric; and optionally c) a second layer of fabric comprising second fibers; wherein the
(Continued)

second layer of fabric and first sound barrier film are bound together through a second interpenetrated binding layer wherein the first cured composition of the first sound barrier film is interpenetrated by the second fibers of the second layer of fabric. Typically, the sound and heat insulating blanket comprises no adhesive binding the first and second layers of fabric and the sound barrier film.

15 Claims, 1 Drawing Sheet

(51) Int. Cl.
    *B32B 5/24* (2006.01)
    *B32B 25/10* (2006.01)
    *B32B 25/14* (2006.01)
    *A62C 8/06* (2006.01)

(52) U.S. Cl.
    CPC .............. *B32B 25/14* (2013.01); *A62C 8/06* (2013.01); *B32B 2260/021* (2013.01); *B32B 2260/046* (2013.01); *B32B 2262/0269* (2013.01); *B32B 2262/101* (2013.01); *B32B 2307/102* (2013.01); *B32B 2307/304* (2013.01); *B32B 2605/18* (2013.01)

(58) Field of Classification Search
    CPC ........ B32B 2260/021; B32B 2260/046; B32B 2262/0269; B32B 2262/101; B32B 2307/102; B32B 2307/304; B32B 2605/18; A62C 8/06
    USPC ....................................................... 181/208
    See application file for complete search history.

(56) References Cited

U.S. PATENT DOCUMENTS

| | | | |
|---|---|---|---|
| 6,207,245 B1 | 3/2001 | Miller | |
| 8,312,963 B2* | 11/2012 | Ogawa | B32B 29/02 |
| | | | 181/290 |
| 2003/0148693 A1 | 8/2003 | Erb, Jr. | |
| 2004/0081797 A1* | 4/2004 | Simmons | B32B 3/28 |
| | | | 428/137 |
| 2005/0263346 A1* | 12/2005 | Nishimura | E04B 1/86 |
| | | | 181/290 |
| 2006/0046598 A1 | 3/2006 | Shah | |
| 2008/0166937 A1 | 7/2008 | Garvey | |
| 2012/0243807 A1 | 9/2012 | Pascoe | |
| 2013/0341120 A1 | 12/2013 | Koo | |
| 2017/0056693 A1* | 3/2017 | Hutton | A62C 3/0257 |

FOREIGN PATENT DOCUMENTS

| | | |
|---|---|---|
| EP | 1 586 442 | 10/2005 |
| EP | 2 236 286 | 10/2010 |
| EP | 2 363 325 | 9/2011 |
| GB | 1599540 | 10/1981 |
| JP | 2007-23102 | 2/2007 |
| KR | 10-0370343 | 1/2003 |
| KR | 20100064841 A | 6/2010 |
| KR | 101 132 791 | 6/2011 |

OTHER PUBLICATIONS

DuPont, "DuPont™ Neoprene Curing Systems," (Rev. 5, 2010).
International Search Report for PCT/US2016/030872, dated Jul. 22, 2016 (5 pages).
"Aerospace Rubber and Sealing Materials", Liu Jia, 1st Edition, pp. 179-180, *National Defense Industry Press*, (Nov. 2011).
"Handbook of Plastics and Rubber Additives", Lu Shiguang, 1st Edition., pp. 515-516, *China Light Industry Press*, (Sep. 1995).

* cited by examiner

SOUND AND HEAT INSULATING BLANKET

CROSS REFERENCE TO RELATED APPLICATIONS

This application is a national stage filing under 35 U.S.C. 371 of PCT/US2016/030872, filed May 5, 2016, which claims the benefit of U.S. Provisional Patent Application No. 62/157,297, filed May 5, 2015, the disclosures of which are incorporated by reference in their entirety herein.

FIELD OF THE DISCLOSURE

This disclosure relates to sound and heat insulating blankets such as may be used in the fuselage of aerospace vehicles, which blankets may have fire resistant properties and are typically constructed without adhesive.

BACKGROUND OF THE DISCLOSURE

The following references may be relevant to the general field of technology of the present disclosure: GB 1,599,540; KR 10-0370343; JP2007-23102; Aubert Y. Coran, "Vulcanization", *The Science and Technology of Rubber*, Chapter 7 (Third Edition, Elsevier 2005), Chapter 7 (Third Edition, Elsevier 2005); DuPont, "DuPont™ Neoprene Curing Systems," (Rev. 5, 2010).

SUMMARY OF THE DISCLOSURE

Briefly, the present disclosure provides a sound and heat insulating blanket comprising: a) a first layer of fabric comprising first fibers; and b) a first sound barrier film comprising a first rubber; wherein the first layer of fabric and first sound barrier film are bound together through a first interpenetrated binding layer wherein the first rubber of the first sound barrier film is interpenetrated by the first fibers of the first layer of fabric. Typically, the sound and heat insulating blanket comprises no adhesive binding the first layer of fabric and the first sound barrier film. In some embodiments, the first layer of fabric is a non-woven fabric or felt. In some embodiments, the first fibers are selected from meta-aramid fibers, glass fibers, and melamine fibers; typically meta-aramid fibers. In some embodiments, the first layer of fabric has a thickness of greater than 1.0 mm and less than 32.0 mm. In some embodiments, the first rubber comprises a crosslinked chloroprene resin. In some embodiments, the cured composition additionally comprises a fire retardant particle system comprising: d) 5-95 wt % particulate magnesium hydroxide (Mg(OH)$_2$); and e) 5-95 wt % particulate aluminum trihydrate (Al(OH)$_3$). In some embodiments, the particulate aluminum trihydrate (Al(OH)$_3$) has a mean particle size of greater than 30 microns and less than 400 microns, and more typically a mean particle size of greater than 82 microns. In some embodiments, the first sound barrier film has a thickness of less than 1300 microns and greater than 135 microns.

In many embodiments, the sound and heat insulating blanket additionally comprises: c) a second layer of fabric comprising second fibers; wherein the second layer of fabric and first sound barrier film are bound together through a second interpenetrated binding layer wherein the first cured composition of the first sound barrier film is interpenetrated by the second fibers of the second layer of fabric. Typically, the sound and heat insulating blanket comprises no adhesive binding the second layer of fabric and the first sound barrier film.

Typically, the sound and heat insulating blanket according to the present disclosure is fire resistant to the extent that it passes the test specified as of the filing date of this application in Appendix F, part VI, to US Federal Aviation Regulations § 25.856(a).

Additional embodiments of the sound and heat insulating blanket of the present disclosure are described below under "Selected Embodiments."

The present disclosure additionally provides methods of making a sound and heat insulating blanket according to the present disclosure comprising the steps of: 1) providing the first layer of fabric comprising first fibers; 2) providing a first film of a curable composition comprising a first curable rubber which cures to form the first rubber; 3) bringing together the first layer of fabric and first film of a curable composition to create a first uncured interpenetrated binding layer wherein the first curable composition is interpenetrated by the first fibers of the first layer of fabric; and 4) curing the first curable composition.

The present disclosure additionally provides methods of making a sound and heat insulating blanket according to the present disclosure comprising the steps of: 1) providing the first layer of fabric comprising first fibers; 2) providing a first film of a curable composition comprising a first curable rubber which cures to form the first rubber; 3) providing the second layer of fabric comprising second fibers; 3) bringing together the first layer of fabric, the first film of a curable composition, and the second layer of fabric to create a first uncured interpenetrated binding layer wherein the curable composition is interpenetrated by the first fibers of the first layer of fabric and a second uncured interpenetrated binding layer wherein the curable composition is interpenetrated by the second fibers of the second layer of fabric; and 4) curing the curable composition.

In some embodiments of the methods of the present disclosure, the first curable rubber comprises: a) 80.0-99.9 wt % of a chloroprene resin; b) 0.06-13 wt % of trimethyl thiourea; and c) 0.06-13 wt % of a benzothiazolesulfenamide.

Additional embodiments of the methods of the present disclosure are described below under "Selected Embodiments."

In this application:

a "continuous processes by roll" is a process that may be operated continuously from the loading of roll good raw materials until the roll good raw materials are expended;

"benzothiazolesulfenamide" means a species containing the moiety shown in formula I:

which may include N-cyclohexylbenzeneothiazole-2-sulfenamide (CBS):

N-t-butylbenzeneothiazole-2-sulfenamide (TBBS):

N-dicyclohexylbenzeneothiazole-2-sulfenamide (DCBS):

2-morpholinothiobenzothiazole (MBS):

and the like, and which may be substituted;

"chloroprene resin" means a resin comprising a polymer or copolymer of chloroprene;

"trimethylthiourea" or "TMTU" means $(CH_3)_2N-C(=S)-NHCH_3$; and

"substituted" means, for a chemical species, group or moiety, substituted by conventional substituents which do not interfere with the desired product or process, e.g., substituents can be alkyl, alkoxy, aryl, phenyl, halo (F, Cl, Br, I), cyano, nitro, etc.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides sound and heat insulating blankets such as may be used in the fuselage of aerospace vehicles. In some embodiments the blankets have fire resistant properties. The blankets typically comprise fabric and barrier layers and typically are constructed without adhesive joining fabric and barrier layers.

Figure 1:
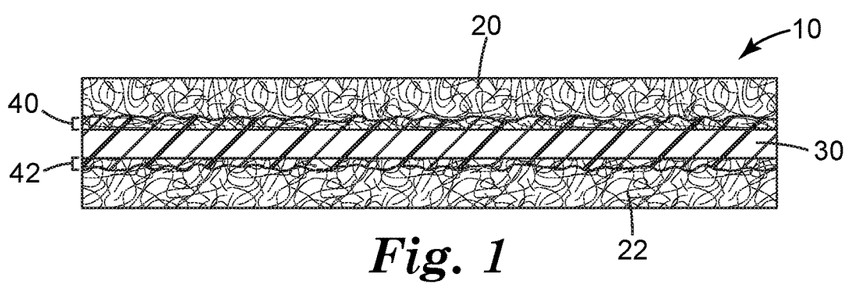
FIG. 1 is a cross section of a three-layer blanket according to the present invention.
Figure 2:
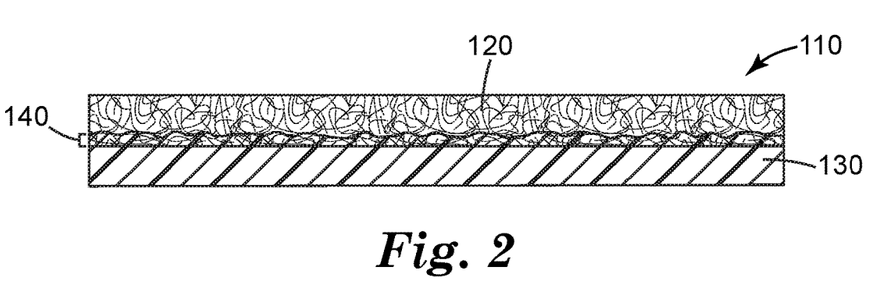
FIG. 2 is a cross section of a two-layer blanket according to the present invention.
Figure 3:
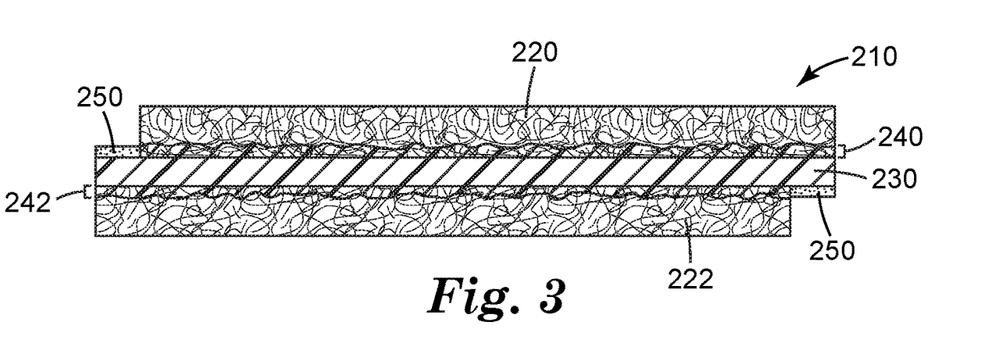
FIG. 3 is a cross section of a three-layer blanket according to the present invention.

With reference to FIGS. 1-3, a blanket 10, 110, 210 according to the present disclosure includes at least one sound barrier film 30, 130, 230 and at least one fabric layer 20, 120, 220 joined to the sound barrier film 30, 130, 230. In some embodiments, the blanket additionally comprises a second fabric layer 22, 222 joined to the sound barrier film 30, 130, 230. Fabric layers may be selected from any suitable fibrous material, which may include woven fabrics, non-woven fabrics, felts or other fabrics. Sound barrier films may be selected from any suitable material and typically include a rubber, more typically a chloroprene rubber. Typically the uncured material is sufficiently tacky and malleable in itself that it can be joined with fabric layers without the use of adhesive and thereafter cured to form a strong interlayer bond. The ability to exclude additional adhesive can result in reduced cost and complexity in manufacture. Typically the uncured material contains a fire retardant particle system. In some embodiments, the sound barrier film is selected from those described in U.S. Patent Application 62/157,287, filed on even date herewith, titled "Curable Composition for Sound Barrier Film," the disclosure of which is incorporated herein by reference. In some embodiments, not depicted, the blanket additionally comprises a second sound barrier film joined to the second fabric layer 22, 222, and optionally a third fabric layer joined to the second sound barrier film. Materials for each fabric layer may be selected independently from the materials described herein. Materials for each sound barrier film may be selected independently from the materials described herein.

Sound barrier film 30, 130, 230 and fabric layer 20, 120, 220 are joined through interpenetrated binding layer 40, 140, 240. Sound barrier film 30, 130, 230 and second fabric layer 22, 222 are likewise joined through second interpenetrated binding layer 42, 242. In the interpenetrated binding layers, the rubber of the sound barrier film is interpenetrated by fibers of the fabric layers to form a strong bond without the use of adhesives. The ability to eliminate adhesive reduces material cost and manufacturing complexity, and, most importantly in applications where fire resistance is critical, it can reduce flammable content.

In some embodiments, such as depicted in FIG. 3, fabric layers 220, 222 are reduced in width so as expose barrier film 230, so as to allow for lap joining of adjacent blankets. A narrow band of adhesive 250 may be provided for joining the barrier film of one blanket to the barrier film of an adjacent blanket.

Selected Embodiments

The following embodiments, designated by letter and number, are intended to further illustrate the present disclosure but should not be construed to unduly limit this disclosure.

B1. A sound and heat insulating blanket comprising:
a) a first layer of fabric comprising first fibers; and
b) a first sound barrier film comprising a cured composition comprising a first rubber;
wherein the first layer of fabric and first sound barrier film are bound together through a first interpenetrated binding layer wherein the first cured composition of the first sound barrier film is interpenetrated by the first fibers of the first layer of fabric.

B2. The sound and heat insulating blanket according to embodiment B1 comprising no adhesive binding the first layer of fabric and the first sound barrier film.

B3. The sound and heat insulating blanket according to any of the preceding embodiments wherein the first layer of fabric is a non-woven fabric.

B4. The sound and heat insulating blanket according to any of the preceding embodiments wherein the first layer of fabric is a felt.

B5. The sound and heat insulating blanket according to any of embodiments B1-B2 wherein the first layer of fabric is a woven fabric.

B6. The sound and heat insulating blanket according to any of the preceding embodiments wherein the first fibers are meta-aramid fibers.

B7. The sound and heat insulating blanket according to any of embodiments B1-B5 wherein the first fibers are glass fibers.

B8. The sound and heat insulating blanket according to any of embodiments B1-B2 wherein the first layer of fabric is a polymeric fiber-and-node structure.

B9. The sound and heat insulating blanket according to embodiment B8 wherein the polymeric fiber-and-node structure is a melamine foam.

B10. The sound and heat insulating blanket according to any of the preceding embodiments wherein the first layer of fabric has a thickness of greater than 1.0 mm.

B11. The sound and heat insulating blanket according to any of the preceding embodiments wherein the first layer of fabric has a thickness of greater than 3.0 mm.

B12. The sound and heat insulating blanket according to any of the preceding embodiments wherein the first layer of fabric has a thickness of less than 32.0 mm.

B13. The sound and heat insulating blanket according to any of the preceding embodiments wherein the first layer of fabric has a thickness of less than 21.0 mm.

B14. The sound and heat insulating blanket according to any of the preceding embodiments wherein the first layer of fabric has a thickness of less than 14.0 mm.

B15. The sound and heat insulating blanket according to any of the preceding embodiments wherein the first rubber comprises a crosslinked chloroprene resin.

B16. The sound and heat insulating blanket according to any of the preceding embodiments wherein the first rubber comprises a crosslinked chloroprene resin and wherein the cured composition additionally comprises a fire retardant particle system comprising:
    d) 5-95 wt % particulate magnesium hydroxide $(Mg(OH)_2)$; and
    e) 5-95 wt % particulate aluminum trihydrate $(Al(OH)_3)$.

B17. The sound and heat insulating blanket according to embodiment B16 wherein the fire retardant particle system comprises:
    d) 10-45 wt % particulate magnesium hydroxide $(Mg(OH)_2)$; and
    e) 55-90 wt % particulate aluminum trihydrate $(Al(OH)_3)$.

B18. The sound and heat insulating blanket according to embodiment B16 wherein the fire retardant particle system comprises:
    d) 15-40 wt % particulate magnesium hydroxide $(Mg(OH)_2)$; and
    e) 60-85 wt % particulate aluminum trihydrate $(Al(OH)_3)$.

B19. The sound and heat insulating blanket according to any of embodiments B16-B18 wherein the particulate aluminum trihydrate $(Al(OH)_3)$ has a mean particle size of greater than 30 microns.

B20. The sound and heat insulating blanket according to any of embodiments B16-B18 wherein the particulate aluminum trihydrate $(Al(OH)_3)$ has a mean particle size of greater than 36 microns.

B21. The sound and heat insulating blanket according to any of embodiments B16-B18 wherein the particulate aluminum trihydrate $(Al(OH)_3)$ has a mean particle size of greater than 42 microns.

B22. The sound and heat insulating blanket according to any of embodiments B16-B18 wherein the particulate aluminum trihydrate $(Al(OH)_3)$ has a mean particle size of greater than 82 microns.

B23. The sound and heat insulating blanket according to any of embodiments B16-B22 wherein the particulate aluminum trihydrate $(Al(OH)_3)$ has a mean particle size of less than 400 microns.

B24. The sound and heat insulating blanket according to any of embodiments B16-B22 wherein the particulate aluminum trihydrate $(Al(OH)_3)$ has a mean particle size of less than 170 microns.

B25. The sound and heat insulating blanket according to any of embodiments B16-B24 wherein the weight ratio of first rubber to fire retardant particle system is between 1:3 and 3:1.

B26. The sound and heat insulating blanket according to any of embodiments B16-B24 wherein the weight ratio of first rubber to fire retardant particle system is between 1:3 and 1:1.

B27. The sound and heat insulating blanket according to any of embodiments B16-B24 wherein the weight ratio of first rubber to fire retardant particle system is between 2:5 and 2:3.

B28. The sound and heat insulating blanket according to any of embodiments B16-B24 wherein the weight ratio of first rubber to fire retardant particle system is between 1:1 and 3:1.

B29. The sound and heat insulating blanket according to any of embodiments B14-B26 wherein the weight ratio of first rubber to fire retardant particle system is between 10:9 and 2:1.

B30. The sound and heat insulating blanket according to any of the preceding embodiments wherein the cured composition additionally comprises chlorinated paraffin.

B31. The sound and heat insulating blanket according to any of the preceding embodiments wherein the cured composition additionally comprises a phosphorus-containing plasticizer.

B32. The sound and heat insulating blanket according to any of the preceding embodiments wherein the cured composition additionally comprises carbon black.

B33. The sound and heat insulating blanket according to any of the preceding embodiments wherein the cured composition comprises no antimony.

B34. The sound and heat insulating blanket according to any of the preceding embodiments wherein the cured composition comprises less than 3.5 wt % zinc oxide.

B35. The sound and heat insulating blanket according to any of the preceding embodiments wherein the cured composition additionally comprises less than 1.5 wt % zinc oxide.

B36. The sound and heat insulating blanket according to any of the preceding embodiments wherein the first sound barrier film has a thickness of less than 1300 microns.

B37. The sound and heat insulating blanket according to any of the preceding embodiments wherein the first sound barrier film has a thickness of less than 1100 microns.
B38. The sound and heat insulating blanket according to any of the preceding embodiments wherein the first sound barrier film has a thickness of less than 600 microns.
B39. The sound and heat insulating blanket according to any of the preceding embodiments wherein the first sound barrier film has a thickness of less than 500 microns.
B40. The sound and heat insulating blanket according to any of the preceding embodiments wherein the first sound barrier film has a thickness of greater than 135 microns.
B41. The sound and heat insulating blanket according to any of the preceding embodiments wherein the first sound barrier film has a thickness of greater than 300 microns.
B42. The sound and heat insulating blanket according to any of the preceding embodiments which is fire resistant to the extent that it passes the test specified as of the filing date of this application in Appendix F, part VI, to US Federal Aviation Regulations § 25.856(a).
BT1. The sound and heat insulating blanket according to any of embodiments B1-B42 additionally comprising:
  c) a second layer of fabric comprising second fibers;
wherein the second layer of fabric and first sound barrier film are bound together through a second interpenetrated binding layer wherein the first cured composition of the first sound barrier film is interpenetrated by the second fibers of the second layer of fabric.
BT2. The sound and heat insulating blanket according to embodiment BT1 comprising no adhesive binding the second layer of fabric and the first sound barrier film.
BT3. The sound and heat insulating blanket according to any of embodiments BT1-BT2 wherein the second layer of fabric is a non-woven fabric.
BT4. The sound and heat insulating blanket according to any of embodiments BT1-BT2 wherein the second layer of fabric is a felt.
BT5. The sound and heat insulating blanket according to any of embodiments BT1-BT2 wherein the second layer of fabric is a woven fabric.
BT6. The sound and heat insulating blanket according to any of embodiments BT1-BT5 wherein the second fibers are meta-aramid fibers.
BT7. The sound and heat insulating blanket according to any of embodiments BT1-BT5 wherein the second fibers are glass fibers.
BT8. The sound and heat insulating blanket according to any of embodiments BT1-BT2 wherein the second layer of fabric is a polymeric fiber-and-node structure.
BT9. The sound and heat insulating blanket according to embodiment BT8 wherein the polymeric fiber-and-node structure is a melamine foam.
BT10. The sound and heat insulating blanket according to any of embodiments BT1-BT9 wherein the second layer of fabric has a thickness of greater than 1.0 mm.
BT11. The sound and heat insulating blanket according to any of embodiments BT1-BT9 wherein the second layer of fabric has a thickness of greater than 3.0 mm.
BT12. The sound and heat insulating blanket according to any of embodiments BT1-BT11 wherein the second layer of fabric has a thickness of less than 32.0 mm.
BT13. The sound and heat insulating blanket according to any of embodiments BT1-BT11 wherein the second layer of fabric has a thickness of less than 21.0 mm.
BT14. The sound and heat insulating blanket according to any of embodiments BT1-BT11 wherein the second layer of fabric has a thickness of less than 14.0 mm.

M1. A method of making a sound and heat insulating blanket according to any of the preceding embodiments comprising the steps of:
  1) providing the first layer of fabric comprising first fibers;
  2) providing a first film of a curable composition comprising a first curable rubber which cures to form the first rubber;
  3) bringing together the first layer of fabric and first film of a curable composition to create a first uncured interpenetrated binding layer wherein the first curable composition is interpenetrated by the first fibers of the first layer of fabric; and
  4) curing the first curable composition.
M2. The method according to embodiment M1 wherein the first layer of fabric is provided as a roll good, the first film of a curable composition is provided as a roll good, and the method is carried out as a continuous processes by roll.
M3. The method according to any of embodiments M1-M2 wherein the step of bringing together the first layer of fabric and first film of a curable composition to create a first uncured interpenetrated binding layer comprises calendaring.
MT1. A method of making a sound and heat insulating blanket according to any of embodiments BT1-BT14 comprising the steps of:
  1) providing the first layer of fabric comprising first fibers;
  2) providing a first film of a curable composition comprising a first curable rubber which cures to form the first rubber;
  3) providing the second layer of fabric comprising second fibers;
  3) bringing together the first layer of fabric, the first film of a curable composition, and the second layer of fabric to create a first uncured interpenetrated binding layer wherein the curable composition is interpenetrated by the first fibers of the first layer of fabric and a second uncured interpenetrated binding layer wherein the curable composition is interpenetrated by the second fibers of the second layer of fabric; and
  4) curing the curable composition.
MT2. The method according to embodiment MT1 wherein the first layer of fabric is provided as a roll good, the second layer of fabric is provided as a roll good, the first film of a curable composition is provided as a roll good, and the method is carried out as a continuous processes by roll.
MT3. The method according to any of embodiments MT1-MT2 wherein the step of bringing together the first layer of fabric, the first film of a curable composition, and the second layer of fabric to create first and second uncured interpenetrated binding layers comprises calendaring.
MC1. The method according to any of embodiments M1-M3 or MT1-MT3 wherein the first curable rubber comprises a chloroprene resin.
CC1. The method according to embodiment MC1 wherein the first curable rubber comprises:
  a) 80.0-99.9 wt % of a chloroprene resin;
  b) 0.06-13 wt % of trimethyl thiourea; and
  c) 0.06-13 wt % of a benzothiazolesulfenamide.
CC2. The method according to embodiment CC1 wherein the benzothiazolesulfenamide is N-alkyl-2-benzothiazolesulfenamide, wherein the alkyl group contains 2-10 carbon atoms and is straight, branched, or cyclic.
CC3. The method according to embodiment CC1 wherein the benzothiazolesulfenamide is N-cyclohexyl-2-benzothiazolesulfenamide.

CC4. The method according to any of embodiments MC1 or CC1-CC3 wherein the first curable rubber comprises greater than 0.11 wt % of trimethyl thiourea.
CC5. The method according to any of embodiments MC1 or CC1-CC3 wherein the first curable rubber comprises greater than 0.30 wt % of trimethyl thiourea.
CC6. The method according to any of embodiments CC1-CC5 wherein the first curable rubber comprises less than 7.0 wt % of trimethyl thiourea.
CC7. The method according to any of embodiments CC1-CC5 wherein the first curable rubber comprises less than 3.0 wt % of trimethyl thiourea.
CC8. The method according to any of embodiments MC1 or CC1-CC7 wherein the first curable rubber comprises greater than 0.11 wt % of the benzothiazolesulfenamide.
CC9. The method according to any of embodiments MC1 or CC1-CC7 wherein the first curable rubber comprises greater than 0.30 wt % of the benzothiazolesulfenamide.
CC10. The method according to any of embodiments CC1-CC9 wherein the first curable rubber comprises less than 7.0 wt % of the benzothiazolesulfenamide.
CC11. The method according to any of embodiments CC1-CC9 wherein the first curable rubber comprises less than 3.0 wt % of the benzothiazolesulfenamide.
CC12. The method according to any of embodiments MC1 or CC1-CC11 wherein the chloroprene resin comprises a polymer or copolymer of chloroprene wherein greater than 55% of the monomer units of the polymer or copolymer are derived from chloroprene.
CC13. The method according to any of embodiments MC1 or CC1-CC11 wherein the chloroprene resin comprises a polymer or copolymer of chloroprene wherein greater than 78% of the monomer units of the polymer or copolymer are derived from chloroprene.
CC14. The method according to any of embodiments MC1 or CC1-CC11 wherein the chloroprene resin comprises a polymer or copolymer of chloroprene wherein greater than 91% of the monomer units of the polymer or copolymer are derived from chloroprene.
CC15. The method according to any of embodiments MC1 or CC1-CC11 wherein the chloroprene resin comprises a polymer or copolymer of chloroprene wherein greater than 99% of the monomer units of the polymer or copolymer are derived from chloroprene.
CC16. The method according to any of embodiments MC1 or CC1-CC11 wherein the curable composition additionally comprises a fire retardant particle system comprising:
  d) 5-95 wt % particulate magnesium hydroxide $(Mg(OH)_2)$; and
  e) 5-95 wt % particulate aluminum trihydrate $(Al(OH)_3)$.
CC17. The method according to embodiment CC16 wherein the fire retardant particle system comprises:
  d) 10-45 wt % particulate magnesium hydroxide $(Mg(OH)_2)$; and
  e) 55-90 wt % particulate aluminum trihydrate $(Al(OH)_3)$.
CC18. The method according to embodiment CC16 wherein the fire retardant particle system comprises:
  d) 15-40 wt % particulate magnesium hydroxide $(Mg(OH)_2)$; and
  e) 60-85 wt % particulate aluminum trihydrate $(Al(OH)_3)$.
CC19. The method according to any of embodiments CC16-CC18 wherein the particulate aluminum trihydrate $(Al(OH)_3)$ has a mean particle size of greater than 30 microns.
CC20. The method according to any of embodiments CC16-CC18 wherein the particulate aluminum trihydrate $(Al(OH)_3)$ has a mean particle size of greater than 36 microns.
CC21. The method according to any of embodiments CC16-CC18 wherein the particulate aluminum trihydrate $(Al(OH)_3)$ has a mean particle size of greater than 42 microns.
CC22. The method according to any of embodiments CC16-CC18 wherein the particulate aluminum trihydrate $(Al(OH)_3)$ has a mean particle size of greater than 82 microns.
CC23. The method according to any of embodiments CC16-CC22 wherein the particulate aluminum trihydrate $(Al(OH)_3)$ has a mean particle size of less than 400 microns.
CC24. The method according to any of embodiments CC16-CC22 wherein the particulate aluminum trihydrate $(Al(OH)_3)$ has a mean particle size of less than 170 microns.
CC25. The method according to any of embodiments CC16-CC24 wherein the weight ratio of first curable rubber to fire retardant particle system is between 1:3 and 3:1.
CC26. The method according to any of embodiments CC16-CC24 wherein the weight ratio of first curable rubber to fire retardant particle system is between 1:3 and 1:1.
CC27. The method according to any of embodiments CC16-CC24 wherein the weight ratio of first curable rubber to fire retardant particle system is between 2:5 and 2:3.
CC28. The method according to any of embodiments CC16-CC24 wherein the weight ratio of first curable rubber to fire retardant particle system is between 1:1 and 3:1.
CC29. The method according to any of embodiments CC16-CC24 wherein the weight ratio of first curable rubber to fire retardant particle system is between 10:9 and 2:1.
CC30. The method according to any of embodiments MC1 or CC1-CC29 wherein the curable composition additionally comprises chlorinated paraffin.
CC31. The method according to any of embodiments MC1 or CC1-CC30 wherein the curable composition additionally comprises a phosphorus-containing plasticizer.
CC32. The method according to any of embodiments MC1 or CC1-CC31 wherein the curable composition additionally comprises carbon black.
CC33. The method according to any of embodiments MC1 or CC1-CC32 wherein the curable composition comprises no antimony.
CC34. The method according to any of embodiments MC1 or CC1-CC33 wherein the curable composition comprises less than 3.5 wt % zinc oxide.
CC35. The method according to any of embodiments MC1 or CC1-CC33 wherein the curable composition comprises less than 1.5 wt % zinc oxide.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.
The following abbreviations are used to describe the examples:
  ° C.: degree Centigrade
  ° F.: degree Fahrenheit cm: centimeter
g/cm: grams per centimeter
gsm: grams per square centimeter
Kg: kilogram
lb: pound
μm: micrometers
mil: 1/1000 inch
ppi: pounds per inch
psa: pressure sensitive adhesive
rpm: revolutions per minute
Abbreviations for the materials used in the examples are as follows:
Abbreviations for the materials used in the examples are as follows:
AC-18: Octadecanamide, obtained under the trade designation "PROAID AC-18-DSA" from Akrochem Corporation, Akron, Ohio.
ATH-SH20: 100 μm median particle diameter aluminum trihydrate, obtained under the trade designation "SH 20 ALUMINUM TRIHYDRATE" from Dadco Alumina & Chemicals Ltd., St. Peter Port, Guernsey.
C-700: A chlorinated paraffin wax, obtained under the trade designation "CHLOREZ 700" from Dover Chemical Corporation, Dover, Ohio.
CB-1220: A polybutadiene rubber, obtained under the trade designation "BUNA CB-1220" from Lanxess GmbH, Koln, Germany.
CBS: N-cyclohexyl-2-benzothiazolesulfenamide, obtained under the trade designation "DURAX CBS" from Vanderbilt Chemicals, LLC, Norwalk, Conn.
EF-2: Trimethylthiourea, obtained under the trade designation "THIATE EF-2" from Vanderbilt Chemicals, LLC.
ITASA: A 4.4 mil (111.7 μm), 120 gsm double sided clay coated paper liner, having a silicone release coating over one of the clay coats, obtained under the trade designation "120/SC2DM50" from Itasa B Sorabilla s/n, Andoain, Spain.
MD-1024: 1,2-Bis(3,5-di-tert-butyl-4-hydroxyhydrocinnamoyl)hydrazine, obtained under the trade designation "IRGANOX MD 1024" from BASF Corporation, Florham Park, N.J.
Mg(OH)$_2$: 2 μm magnesium hydroxide, obtained under the trade designation "VERSAMAG" from Akrochem Corporation.
N-550: A carcass grade carbon black, obtained under the trade designation "N550 CARBON BLACK" from Continental Carbon from Houston, Tex.
Neoprene: A neoprene rubber, obtained under the trade designation "NEOPRENE-TW" from E.I. du Pont de Nemours and Company, Wilmington, Del.
RF-65: A phenol/isopropylated phosphate, obtained under the trade designation "REOFOS 65" from Chemtura Corporation, Philadelphia, Pa.
SA: Stearic acid, obtained from Sigma-Aldrich Company.
ZBR: Zinc borate, obtained from Akrochem Corporation.
ZnO: Zinc oxide, obtained from Sigma-Aldrich Company.

FR Barrier Film

A filled, neoprene based fire-resistant film, was prepared as follows. A 640 lb (290.2 Kg) batch of compounded rubber was made according to the empirical formulation listed in Table 1. 100 parts Neoprene was transferred to a Banbury blender operating at 21° C. and 35 rpm. With the exception of RF-65, the remaining components listed in Table 1 were homogeneously dry mixed. RF-65 was then blended into the dry mix before transferring to the Banbury blender. The temperature was then raised to 190° F. (87.8° C.) over 5 minutes, after which the compounded rubber was removed.

TABLE 1

| Neoprene | 100.0 |
|---|---|
| RF-65 | 6.0 |
| MD-1024 | 2.0 |
| ATH-SH20 | 50.0 |
| Mg(OH)$_2$ | 25.0 |
| ZBR | 20.0 |
| C-700 | 30.0 |
| ZnO | 3.0 |
| AC-18 | 0.5 |
| N-550 | 10.0 |
| SA | 0.5 |
| EF-2 | 1.0 |
| CBS | 1.5 |
| CB-1220 | 4.0 |

The compounded rubber was calendared into a 57 inch (144.8 cm) wide web, at a nominal thickness of 22 mils (55.9 μm), onto the ITASA paper liner, by means of a 3-roll mill at 103-119° F. (39.4-48.3° C.). The web roll was then oven cured at 320° F. (160° C.) for 10 minutes.

Example

An overframe blanket, having a lap joint overlap of 7.6 cm on at least two edges, was prepared as follows. The FR barrier film web was removed from the liner and laid over a 122 cm wide web of 376 gsm needled meta-aramid high loft felt and heated to approximately 135° C. A second 122 cm wide web of a 376 gsm needled meta-aramid medium loft felt was then laid over the opposing surface of the FR barrier film. The three layer construction was then pressed together through a nip roll in order to embed the fibers into the softened film. The three layer stack was cured at 171° C. for approximately 7 minutes by means of a belt-fed oven to lock the fibers into the FR barrier layer.

Comparative

A commercially available aircraft overframe blanket, obtained under the trade designation "EAR THERMAL ACOUSTIC STSYTEM" from Aearo Technologies, LLC, Indianapolis, Ind. The overframe blanket had the same needled meta-aramid felts as described in Example 1, said felts laminated to an FR barrier film by means of psa transfer films.

The Example and the Comparative were subjected to flammability tests according to FAR 25.856a and FAR 25.853a, plus peel strength tests according to ASTM D903. Results are listed in Table 2.

TABLE 2

| | Flammability Test | | Aramid Felt Peel Test ppi (g/cm) | | | |
|---|---|---|---|---|---|---|
| Overframe Blanket | FAR 25.856a | FAR 25.853a | 1$^{st}$. Felt Layer | Failure Mode | 2$^{nd}$. Felt Layer | Failure Mode |
| Example | Pass | Pass | 0.26-1.13 (46.4-201.8) | Fiber tear | 0.26-2.4 (46.4-428.6) | Fiber tear |

TABLE 2-continued

| Overframe Blanket | Flammability Test | | Aramid Felt Peel Test ppi (g/cm) | | | |
|---|---|---|---|---|---|---|
| | FAR 25.856a | FAR 25.853a | 1st. Felt Layer | Failure Mode | 2nd. Felt Layer | Failure Mode |
| Comparative | Pass | Pass | 0.55-1.9 (98.2-339.3) | Fiber tear | 0.18-1.5 (32.1-267.9) | Fiber tear |

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A sound and heat insulating blanket comprising:
   a) a first layer of fabric comprising first fibers; and
   b) a first sound barrier film comprising a first rubber;
   wherein the first layer of fabric and first sound barrier film are bound together through a first interpenetrated binding layer wherein the first rubber of the first sound barrier film is interpenetrated by the first fibers of the first layer of fabric, and wherein the first layer of fabric has a thickness, exclusive of the first interpenetrated binding layer, of greater than 1.0 mm and less than 32.0 mm.

2. The sound and heat insulating blanket according to claim 1 comprising no adhesive binding the first layer of fabric and the first sound barrier film.

3. The sound and heat insulating blanket according to claim 1 wherein the first layer of fabric is a non-woven fabric or felt.

4. The sound and heat insulating blanket according to claim 1 wherein the first fibers are selected from meta-aramid fibers, glass fibers, and melamine fibers.

5. The sound and heat insulating blanket according to claim 1 wherein the first fibers are meta-aramid fibers.

6. The sound and heat insulating blanket according to claim 1 wherein the first rubber comprises a crosslinked chloroprene resin and wherein the cured composition additionally comprises a fire retardant particle system comprising:
   d) 5-95 wt % particulate magnesium hydroxide ($Mg(OH)_2$); and
   e) 5-95 wt % particulate aluminum trihydrate ($Al(OH)_3$).

7. The sound and heat insulating blanket according to claim 6 wherein the particulate aluminum trihydrate ($Al(OH)_3$) has a mean particle size of greater than 30 microns and less than 400 microns.

8. The sound and heat insulating blanket according to claim 6 wherein the particulate aluminum trihydrate ($Al(OH)_3$) has a mean particle size of greater than 82 microns.

9. The sound and heat insulating blanket according to claim 1, wherein the first sound barrier film has a thickness, exclusive of the first interpenetrated binding layer, of less than 1300 microns and greater than 135 microns.

10. The sound and heat insulating blanket according to claim 1 additionally comprising:
    c) a second layer of fabric comprising second fibers;
    wherein the second layer of fabric and first sound barrier film are bound together through a second interpenetrated binding layer wherein the first cured composition of the first sound barrier film is interpenetrated by the second fibers of the second layer of fabric.

11. The sound and heat insulating blanket according to claim 10 comprising no adhesive binding the second layer of fabric and the first sound barrier film.

12. The sound and heat insulating blanket according to claim 1 which is fire resistant to the extent that it passes the test specified as of the filing date of this application in Appendix F, part VI, to US Federal Aviation Regulations § 25.856(a).

13. A method of making a sound and heat insulating blanket according to claim 1 comprising the steps of:
    1) providing the first layer of fabric comprising first fibers;
    2) providing a first film of a curable composition comprising a first curable rubber which cures to form the first rubber;
    3) bringing together the first layer of fabric and first film of a curable composition to create a first uncured interpenetrated binding layer wherein the first curable composition is interpenetrated by the first fibers of the first layer of fabric; and
    4) curing the first curable composition.

14. A method of making a sound and heat insulating blanket according to claim 10 comprising the steps of:
    1) providing the first layer of fabric comprising first fibers;
    2) providing a first film of a curable composition comprising a first curable rubber which cures to form the first rubber;
    3) providing the second layer of fabric comprising second fibers;
    3) bringing together the first layer of fabric, the first film of a curable composition, and the second layer of fabric to create a first uncured interpenetrated binding layer wherein the curable composition is interpenetrated by the first fibers of the first layer of fabric and a second uncured interpenetrated binding layer wherein the curable composition is interpenetrated by the second fibers of the second layer of fabric; and
    4) curing the curable composition.

15. The method according to claim 13 wherein the first curable rubber comprises:
    a) 80.0-99.9 wt % of a chloroprene resin;
    b) 0.06-13 wt % of trimethyl thiourea; and
    c) 0.06-13 wt % of a benzothiazolesulfenamide.

* * * * *

UNITED STATES PATENT AND TRADEMARK OFFICE
CERTIFICATE OF CORRECTION

PATENT NO. : 10,668,701 B2  
APPLICATION NO. : 15/567185  
DATED : June 2, 2020  
INVENTOR(S) : Pingfan Wu Page 1 of 1

It is certified that error appears in the above-identified patent and that said Letters Patent is hereby corrected as shown below:

In the Specification

Column 2
Line 58, delete "N-cyclohexylbenzeneothiazole-" and insert -- N-cyclohexylbenzothiazole- --, therefor.

Column 3
Line 1, delete "N-t-butylbenzeneothiazole-" and insert -- N-t-butylbenzothiazole- --, therefor.
Line 9, delete "N-dicyclohexylbenzeneothiazole-" and insert -- N-dicyclohexylbenzothiazole- --, therefor.

Column 8
Line 34, delete "3)" and insert -- 4) --, therefor.
Line 42, delete "4)" and insert -- 5) --, therefor.

Column 12
Line 49, delete "STSYTEM"" and insert -- SYSTEM" --, therefor.

In the Claims

Column 14
Line 47, in Claim 14, delete "3)" and insert -- 4) --, therefor.
Line 54, in Claim 14, delete "4)" and insert -- 5) --, therefor.

Signed and Sealed this  
Eighth Day of December, 2020

Andrei Iancu  
*Director of the United States Patent and Trademark Office*